(12) United States Patent
Rahman

(10) Patent No.: US 11,425,239 B1
(45) Date of Patent: Aug. 23, 2022

(54) SYSTEMS AND METHODS FOR OPTIMIZING CELLULAR NETWORK PERFORMANCE

(71) Applicant: T-Mobile USA, Inc., Bellevue, WA (US)

(72) Inventor: Muhammad Tawhidur Rahman, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/235,586

(22) Filed: Apr. 20, 2021

(51) Int. Cl.
  *H04M 3/22* (2006.01)
  *H04M 7/00* (2006.01)
  *H04W 24/08* (2009.01)
  *H04M 3/36* (2006.01)
  *H04M 7/12* (2006.01)

(52) U.S. Cl.
  CPC ....... *H04M 3/2227* (2013.01); *H04M 3/2218* (2013.01); *H04M 3/2263* (2013.01); *H04M 3/36* (2013.01); *H04M 7/0057* (2013.01); *H04M 7/126* (2013.01); *H04W 24/08* (2013.01)

(58) Field of Classification Search
  CPC ............ H04M 3/2227; H04M 7/0057; H04M 3/2218; H04M 3/36; H04M 7/126; H03M 3/2263; H04W 24/08
  See application file for complete search history.

(56) References Cited

U.S. PATENT DOCUMENTS

| | | | |
|---|---|---|---|
| 10,834,774 B1* | 11/2020 | Haberman | H04W 16/32 |
| 2018/0227699 A1* | 8/2018 | Kim | H04W 64/003 |
| 2019/0191349 A1* | 6/2019 | Kim | H04W 36/0022 |
| 2020/0120551 A1* | 4/2020 | Mukherjee | H04W 48/18 |
| 2021/0136859 A1* | 5/2021 | Yoo | H04W 76/20 |

* cited by examiner

*Primary Examiner* — Brenda H Pham
(74) *Attorney, Agent, or Firm* — Loeb & Loeb LLP

(57) ABSTRACT

A computer-implemented method of for optimizing cellular network performance including identifying a plurality of voice call records stored on an application server in a first type of cellular network. The method includes analyzing call data associated with the plurality of voice call records, and identifying a set of fall back voice call records. The call data for each voice call record of the set of fall back voice call records includes a fall back indicator indicating that each voice call was initiated using a second type of cellular network. The method includes analyzing cause codes in the call data associated with the set of fall back voice call records and determining, based on the cause codes, a value for at least one KPI associated with the second type of cellular network.

20 Claims, 4 Drawing Sheets

SYSTEMS AND METHODS FOR OPTIMIZING CELLULAR NETWORK PERFORMANCE

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Building the physical and technological infrastructure to support a new cellular radio technology may be capital intensive and time consuming. But cellular networks adopting these upgraded radio technologies may roll out access to this technology in portions of a network or geographical regions even if infrastructure may not yet be in place to support every user on that network in every geographic region. At least until the upgraded radio technology is more widely available, it may be advantageous for a network operator to provide users with access to legacy network and radio technologies if/when the upgraded radio technology is not able to fulfill a particular service. In other words, users implementing the upgraded radio technology may "fall back" to the legacy technology when the upgraded radio technology may not be available.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a computer-implemented method for monitoring 5G standalone customer call performance in a cellular network. The method may include receiving call data from one or more network nodes. The call data may include session initiated protocol (SIP) records and call detail records (CDRs) for a plurality of voice calls made in the cellular network and identifying a set of fall back voice calls from the plurality of voice calls. The SIP records for each of the voice calls in the set of fall back voice calls may include a fall back indicator. The method may include analyzing the CDRs for the set of fall back voice calls to identify one or more termination cause codes associated with the fall back voice calls, and aggregating the one or more termination cause codes identified in the CDRs for the set of fall back voice calls. The method may include determining, based on the aggregated termination cause codes, a value for at least one key performance indicator (KPI) for the cellular network and, based on the at least one KPI for the cellular network, identifying one or more call performance problems associated with the set of fall back voice calls.

In another embodiment, the disclosure describes a computer-implemented method for monitoring 5G standalone customer call performance. The method may include receiving a plurality of call detail records (CDRs) from an internet protocol multimedia subsystem (IMS) core, where each of the plurality of CDRs may include a set of cause codes. The method may include analyzing the plurality of CDRs to identify one or more fall back calls wherein the respective one of the plurality of CDRs of each of the one or more fall back calls may include at least one fall back indicator code. The method may include generating a set of fall back cause codes where the set of fall back cause codes may be determined from the sets of cause codes associated with the CDRs of each of the one or more fall back calls. The method may also include determining a value for call performance metrics based on the cause codes in the set of fall back cause codes and identifying one or more call performance problems based on the values of the one or more call performance metrics.

In another embodiment, the disclosure describes a computer-implemented method of for optimizing cellular network performance. The method may include identifying a plurality of voice call records stored on an application server in a first type of cellular network. The method may include analyzing call data associated with the plurality of voice call records and identifying a set of fall back voice call records of the plurality of voice call records. The call data for each voice call record of the set of fall back voice call records may include a fall back indicator indicating that each voice call associated with each of the fall back voice call records was initiated using a second type of cellular network different than the first type of cellular network. The method may include analyzing cause codes in the call data associated with the set of fall back voice call records and determining, based on the cause codes, a value for at least one key performance indicator (KPI) associated with the second type of cellular network.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1B:
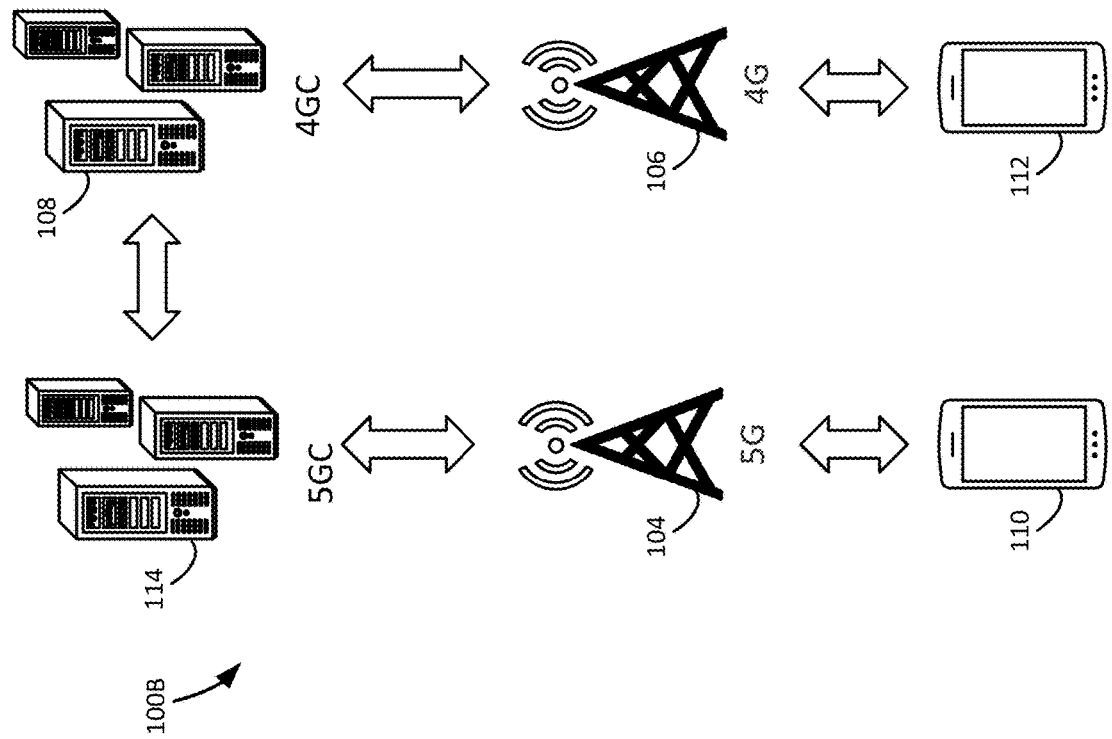
FIG. 1B is a high level data flow diagram for an embodiment of a 5G standalone cellular network in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

When network operators roll out new infrastructure technology, such as new technology leveraging newly available radio frequencies or other network advances, there may be time when the new technology may be up and running but not yet available in all geographies or to all users. While the new technology may still be growing to service new geographic areas and users, it may be advantageous for the network operator to provide access to more established, existing legacy networks or radio technologies. In some embodiments, a network operator may provide for users of the new network to "fall back" to the legacy network if/when a service (e.g., voice call) hosted on the new network fails or is not available. In some embodiments, it may be advantageous for network operators to be able to monitor key performance indicators (KPI) for service quality for users who fall back to the legacy network. The disclosure describes, in some embodiments, systems and methods for detecting fall back calls, monitoring KPI for those calls, and determining steps to optimize call quality over upgraded network technologies.

In some embodiments, a network operator may be introducing and building infrastructure for a new generation cellular network, such as a fifth generation mobile network (5G) and all its corresponding components. As network operators roll out 5G infrastructure and services, user access to 5G service may be more or less accessible to users depending on geographic location, physical barriers to radio signals, etc. In particular, certain network subscribers may be 5G standalone (SA) customers. In some embodiments, 5G SA may provide subscriber services directly through the 5G core network and not depend on the legacy fourth generation (4G) network for providing services. In contrast, 5G non-standalone (NSA) may be built over an existing 4G network, and may not provide for completely independent operation of the 5G service without any interaction with an existing 4G core.

Figure 1A:
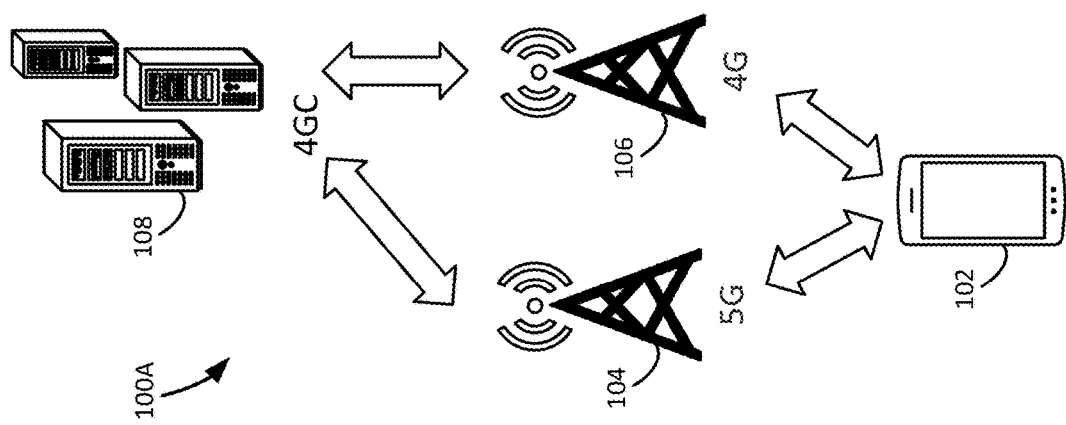
FIG. 1A is a high level data flow diagram for an embodiment of a 5G non-standalone cellular network in accordance with the disclosure.

FIG. 1A illustrates a simple network diagram for an embodiment of a 5G NSA architecture 100A, and FIG. 1B illustrates a simple network diagram for an embodiment of a 5G SA architecture 100B. In FIG. 1A, user equipment (UE) 102 (e.g., mobile telephone, tablet, etc.) may be associated with a user that may be a 5G NSA customer in a 5G NSA network architecture 100A. In such embodiments, the UE 102 may connect to the network via either a 5G base station (e.g., gNodeB or gNB) 104 transmitting at 5G frequencies, (i.e., "new radio" (NR)) or a 4G base station 106 transmitting 4G frequencies (e.g. long term evolution (LTE)). In some embodiments, the 5G base station 104 and the 4G base station (e.g., eNodeB or eNB) 106 may both connect the UE 102 to the 4G core 108 (e.g., evolved packet core (EPC)). In FIG. 1B, a UE 110 may be associated with a user that may be a 5G SA customer and a UE 112 may be associated with a user that may be a 4G customer. In such embodiments, the UE 110 may connect to the network via the 5G base station 104 using new radio (NR), which may provide access to the 5G core 114. The UE 112 may connect to the network via the 4G base station 106, which may provide access to the 4G core 108. In some embodiments, the 5G core 114 and the 4G core 108 may be in communication with one another, but they may also operate independently of one another without the 5G core relying on the 4G core.

In some embodiments, it may be advantageous for a network operator to provide 5G SA customers with access to certain services using 4G components. This may be particularly useful as infrastructure for the 5G network grows and 5G NR may not be available in certain areas or particular locations, but may also be useful after the 5G rollout is complete. In some embodiments, network operators may provide for 5G SA customers to "fall back" to connection via 4G infrastructure if 5G NR signals or access to the 5G core may not be available. For example, a voice call connection for a 5G SA customer over 5G NR may be referred to as voice over NR (VoNR) and a voice call connection over 4G or LTE may be referred to as voice over LTE (VoLTE) or voice over Evolved Packet System (VoEPS). If a UE, such as the UE 110 in FIG. 1B, tries to use voice services in a 5G network that does not support VoNR, the 5G base station (e.g., gNB) 104 may redirect or perform a handover to the 4G network, and consequently may be able to use voice services via VoEPS. In some embodiments, a call that originates as a VoNR call but falls back to VoEPS may be a VoEPS fall back (VoEPSFB) call. In some embodiments, the VoEPSFB call flow may traverse 5G, 4G, and all the layers of the radio and core for both networks. After the voice session may be terminated, the UE 110 may move back to the 5G network for data or other services.

In some embodiments, real-time services, such as voice connections, may be particularly sensitive to even temporary disruptions in network access because, unlike some other network services, voice calls may not meet quality of service standards for customers if a connection is not stable and reliable for indefinite time periods. Accordingly, if a network operator's 5G network may not yet be ready to ensure suitable quality for end-to-end communication for all 5G SA users, voice calls initiated as VoNR calls may fall back to VoEPS calls and become VoEPSFB calls.

In some embodiments, network providers may seek to track and monitor voice call key performance indicators (KPI) that may help provide insight into how the network's voice call service may be experience by a user. Some examples of voice call KPI may be call success rate, drop call rate, call setup time, call setup failure rate, call volume, call abandonment rate, voice quality of service (QoS), etc. Because VoEPSFB calls may be connected through the 4G core (e.g., EPC), it may have traditionally been difficult to determine KPI for VoEPSFB calls separately from standard VoEPS voice calls that were not initiated as VoNR calls. To solve this problem, a network operator may isolate VoEPSFB calls from the remainder of VoEPS calls logged in the internet protocol (IP) multimedia subsystem (IMS) core. In some embodiments, key attributes in the call flow may be identified to differentiate VoEPSFB calls from all other calls. Once the VoEPSFB calls have been identified, such as by call detail records (CDR) stored in the IMS core, CDR cause codes may be analyzed to determine KPI for the VoEPSFB calls.

Figure 2:
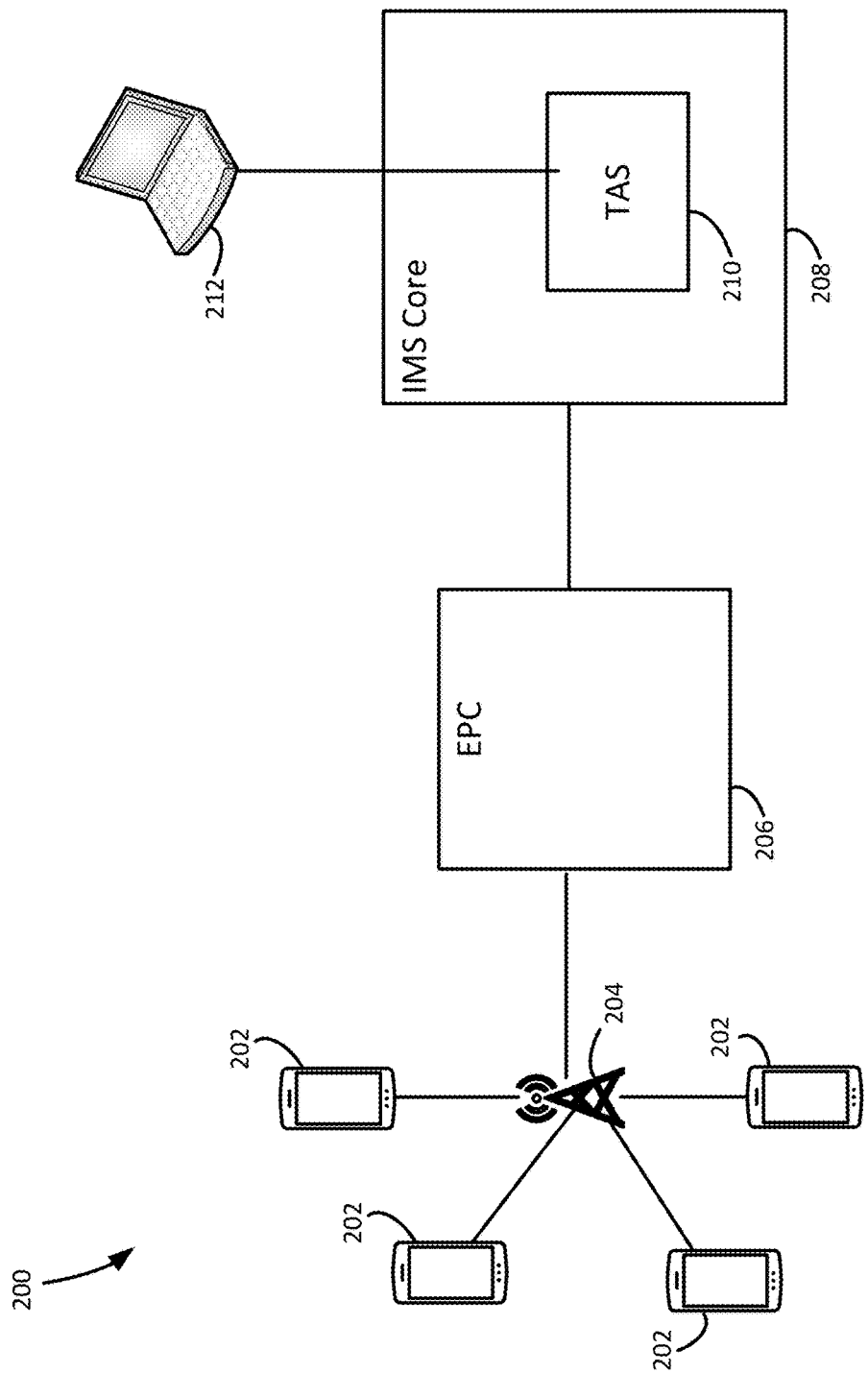
FIG. 2 is a high level diagram of an embodiment of a network environment for a system and methods for optimizing cellular network performance in accordance with the disclosure.

FIG. 2 illustrates a schematic diagram of a portion of a network 200 that be used to perform the methods for optimizing network performance described herein. Those of skill in the art will understand that the network 200 may have many additional components that may not be shown in the figure for ease of illustration, but that such components may also fall within the scope of this disclosure. Additionally, those skilled in the art will recognize that the disclosed methods may be performable using components different than those illustrated in FIG. 2 but that still fall within the scope of the disclosure. In some embodiments, the network 200 may include one or more user computing devices 202 (i.e., user equipment (UE)) that may include wireless communication capabilities to access to a cellular network via one or more base stations 204 (e.g., eNodeB, gNodeB, etc.). The one or more base stations 204 may be part of a radio access network (RAN) and may connect the one or more UEs 202 to the rest of the network. For example, in 4G/LTE networks, the base stations 204 may connect to the Evolved Packet Core (EPC) 206 (i.e., 4G core). In some embodiments, the EPC may include various components, such as a home subscriber server (HSS), serving gateway (SGW), packet data network gateway (PGW), mobility management entity (MME), etc. In 5G networks, the EPC 206 may instead be a 5G core, such as 5G core 114 in FIG. 1. Those skilled in the art will understand that some embodiments of this disclosure may be applicable in 3G, 4G, or 5G networks, or in the combination of such network types.

The EPC 206 may connect users and associated UEs 202 two the IMS core 208. In some embodiments, the IMS core may include various network components, such as a Call Session Control Function (CSCF), which may include a proxy-CSCF, an interrogating-CSCF, and a serving-CSCF. The IMS core 208 may also include one or more application servers, including a telephony application server (TAS) 210. In some embodiments, the TAS 210 may provide VoLTE or VoEPS services. The TAS may be a back to back SIP user agent that may be used to maintain a call state. The TAS may contain the service logic to provide basic call-processing services, including digit analysis, routing, call setup, call waiting, call forwarding, conferencing, etc.

The TAS 210 may also store call detail records (CDR) for voice calls made or attempted to be made over the network 200. In some embodiments, the CDR may be a data record produced in the IMS core 208 that may document the details of voice telephone calls or other events (e.g., text messages, multimedia messages, etc.) and may be created after a call is completed. In some embodiments, the CDR may include various features of the call or other transaction, such as time, duration, completion status, source number, destination number, etc. More specifically, the CDR for each call may include the following data fields:
 Telephone number of originating party;
 Telephone number of receiving party;
 Starting time of the call;
 Call duration;
 Billing phone number charged for the call;
 Identification of the telephone exchange or equipment for writing the record;
 A unique sequence number identifying the record;
 Disposition or results of the call, indicating whether or not the call was connected;
 Routh by which the call left the exchange;
 Call type (e.g., voice, SMS, MMS, RCS, etc.);
 Fault conditions encountered (if any).
Those skilled in the art will understand that a CDR may include more or less data in some embodiments. It may also be contemplated that other network components other than a TAS may store CDR, or that other types of records or groups of records may include the information stored in a CDR and may still be accessed in a manner consistent with the disclosure.

The CDR may include one or more cause codes that may indicate fault the fault or success of a call. In some embodiments, by aggregating this data across a plurality of calls, a network operator (or other party) may determine values for key performance indicators (KPI) associated with voice calls over the network, such as the call setup success rate, call setup failure rate, drop call rate, call setup time, etc. In some embodiments, the CDRs stored on the TAS 210 may be accessed via a client computing device 212. The client computing device 212 may be any suitable computing device capable of accessing data store on the TAS 210, either directly or via other network components. In some embodiments, the client computing device 212 may be a server-type computer configured to analyze call performance data or other network performance and KPI. In some embodiments, the client computing device 212 may be a desktop or laptop computer associated with a user authorized to access the CDR logs, such as a network analyst of the network operator, network engineer, or other authorized individual.

In some embodiments, the TAS 210 may also store Session Initiation Protocol (SIP) records. SIP records may be created as each call is being set up, and may be used by the network operator to initiate the call. In some embodiments, SIP records may include some of the same data that may be provided by the corresponding CDR, but also may include diversion headers, p-source device, user agent, IP address of audio, etc. The SIP record may also include information related to the type of device being used to make a call and the type of network being use to initiate the call. For example, in some embodiments, the SIP record may include an indicator of whether the UE initiating the call may be using 5G NR, VoLTE, VoEPS, etc. In some embodiments, the SIP records may include information from an SIP Invite header, such as a P-Access-Network-Info header that may be used to identify the type of call being made. In some embodiments, the SIP Invite may be the request sent by the calling UE inviting the recipient UE for a call session. In some embodiments, the SIP Invite may include the following structure:
 P-Access-Network-Info: 3GPP-NR-FDD; utran-cell-id-3gpp=[cell id alphanumeric string]
  access-type: 3GPP-NR-FDD
  utran-cell-id-3gpp: [cell id alphanumeric string]
In some embodiments, the access-type may alternatively be 3GPP-UTRAN-FDD, or may be 3GPP-E-UTRAN-FDD, or may be 3GPP-E-UTRAN-FDD. In some embodiments, the value in the "Network" slot in the P-Access-Network-Info header may indicate the network type from which the call may be initiated. For example, for calls initiated using 5G new radio (NR), the Network slot may indicate "NR", and for calls initiated using 4G/LTE, the Network slot may indicate "UTRAN" (i.e., UMTS Terrestrial Radio Access Network) or "E-UTRAN" (i.e., Evolved UTRAN). Those of skill in the art may recognize that other indicators in different locations may be used to indicate the network used to initiate a call that are consistent with the meaning of the disclosure.

In some embodiments, the SIP record for each particular call may be included within the associated CDR for that same call. In some embodiments, the SIP records for each call and the CDR for the associated call may be stored separately in the TAS 210 or elsewhere, but the records for associated calls may be cross-referenced based on data consistent across both types of records. For example, an SIP record and a corresponding CDR may be linked because both may have the same calling number, called number, billing number, and/or start time. Accordingly, a network operator may identify the SIP record corresponding to each CDR.

As described above, it may be useful or advantageous for a network provider to identify calls that began as 5G NR calls but, for whatever reason, were unable to be completed as 5G NR calls but were instead completed as VoEPS calls—i.e., VoEPSFB calls. In some embodiments, by identifying calls in the TAS 210 that include a fall back indicator code, which may be a code in the SIP or CDR indicating that a call originated as a 5G NR call but that fell back to a VoEPS call. In some embodiments, calls may be stored in the IMS core that are completed as VoEPS calls, regardless of whether they began as 5G NR calls or VoEPS calls. To differentiate the VoEPSFB calls stored on the TAS 210 from the normal VoEPS calls, the network operator may analyze the SIP record to determine the value in the "Network" slot in the access-type string. In some embodiments, when the Network slot includes NR, this may indicate that the call was initiated using 5G NR, and if not, then the call may have been initiated using VoEPS over 4G. Once these VoEPSFB calls may be identified on the TAS 210, the network operator may isolate those calls in order to evaluate the KPI for VoEPSFB calls alone. This way, the network operator may be able better identify how 5G SA customers are experiencing real-time services, such as voice calls, even if the 5G NR network may not be immediately available for each call.

Figure 3:
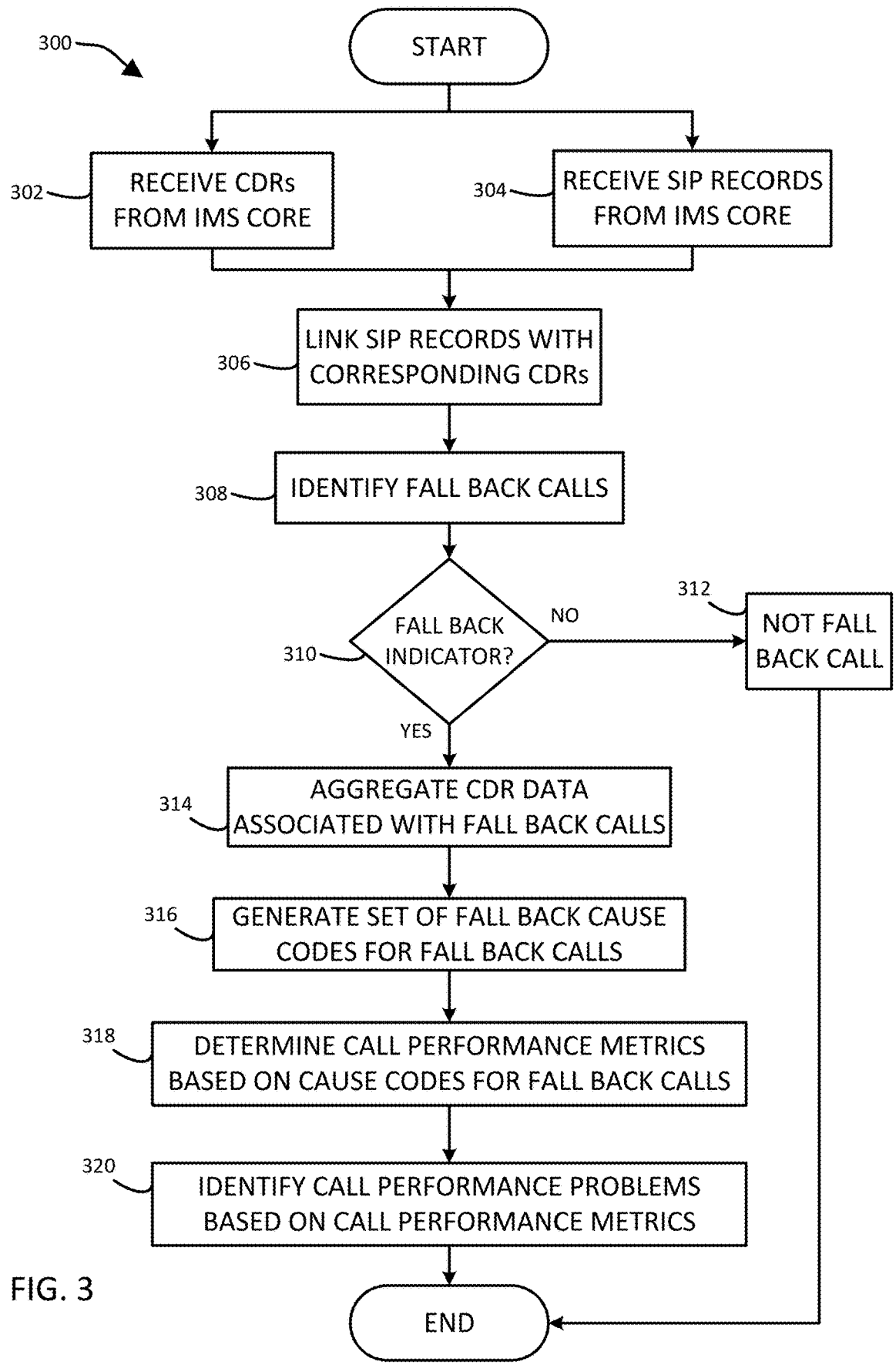
FIG. 3 is a flowchart of an embodiment of a method of optimizing cellular network performance using the system of FIG. 2.

FIG. 3 is a flow chart of an embodiment of a method 300 of optimizing cellular network performance as disclosed herein by identifying calls initiated using upgraded radio technology (e.g., 5G NR) but fell back to legacy radio technology (e.g., VoEPS) and analyzing key performance indicators (KPI) for those fall-back calls. The disclosed method may be performed within the cellular network by a network component, such as a TAS or other computing component, or by a computing device with access to data stored on network components such as the TAS. At 302, the method may include requesting and receiving call detail records (CDRs) from the IMS core, more specifically, from the TAS or another application server storing CDR data for calls taking place on that network. At 304, the method may include receiving SIP records from the IMS core also. In some embodiments, the SIP records and CDRs may be received at the same time, or the SIP records may be included within the CDRs or may be stored and/or linked on the TAS for corresponding calls. At 306, the method may include linking the SIP records with CDR data for the same respective calls. In other words, the method may include grouping each SIP record with the corresponding CDR for the same call. In some embodiments, the CDRs and the SIP records may be collectively referred to as call data. At 308, the method may include identifying which of the call data records may be for fall back calls, such as VoEPSFB calls. At 310, to identify the fall back calls, the method may include determining if the call data for each record includes a fall back indicator. The fall back indicator may include a fall back indicator code within the SIP record, such as in the SIP Invite header. As described above, the fall back indicator code may include the presence of NR in the "Network" field of the P-Access-Network-Info in the SIP record. If no fall back indicator may be identified in the call data for a call record, at 312, the method may include determining that the particular call is not a fall back call.

At 314, if a fall back indicator may be identified in the call data, such as the NR fall back indicator code, the method may include aggregating the CDR data associated with the call records identified as fall back calls. In some embodiments, the CDRs may include cause codes that may appear in cause fields in the CDRs. In some embodiments, the cause codes may be a 32 bit positive integer. Each cause code may indicate any of a variety of causes for why a call, specifically the VoEPSFB calls identified, may have failed. For example, the CDRs may include unique cause codes for no error, no rout to specified transit network, no route to destination, misdialed trunk prefix, channel unacceptable, preemption, user busy, no user responding, no answer from user, subscriber absent, call rejected, number changed, network out of order, temporary failure, switching equipment congestion, quality of service not available, protocol error, etc. The method may include aggregating the cause codes identified in the set of fall back call records and, at 316, may include generating a set of fall back cause codes for the fall back calls. At 318, based at least partially on the fall back cause codes, the method may include determining call performance metrics that may be related to certain key performance indicators (KPI). For example, the cause codes may be used to determine KSI such as call setup success rate, call setup failure rate, drop call rate, call setup time, etc. In some embodiments, each KPI may have a threshold value determined by the network operator, through general best practices, based on historical data, etc. The KPI threshold value may indicate whether the KPI for a particular metric may reflect acceptable network performance or not. For example, the network provider or some other entity or historic performance may identify a maximum acceptable drop call rate for a network or for a portion of the network. If the drop call rate for the fall back calls determined through the CDRs for fall back calls is above the threshold drop call rate, it may indicate a problem with the network or with fall back calls that may need to be addressed. Based on the KPI and other call performance metrics, at 320, the method may include identifying call performance problems and seeking to remedy them so as to optimize cellular network performance and reliability and maximize customer satisfaction and experience.

Accordingly, in some embodiments, the method of optimizing cellular network performance may provide a technical solution to the technical problem of identifying a particular type of calls—those that are initiated using an upgraded radio technology (e.g., 5G NR), but that fall back to legacy radio technology (e.g., VoEPS or VoLTE)—and analyzing the KPI associated with those type of calls. The disclosed method allows a network operator to isolate a unique set of call types that may encounter problems unique to 5G SA customers. Identification of the types of problems encountered by this set of subscribers may provide for a technical way to increase satisfaction of those customers and retain and grow business.

Figure 4:
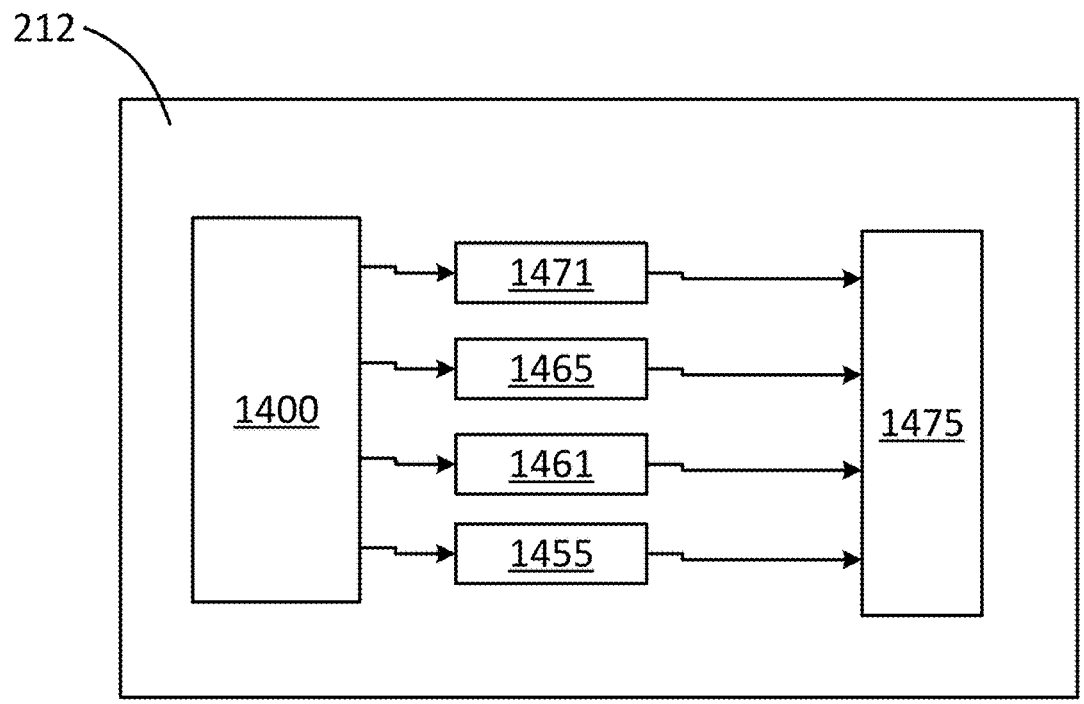
FIG. 4 is a schematic illustration of elements of an embodiment of an example computing device.
Figure 5:
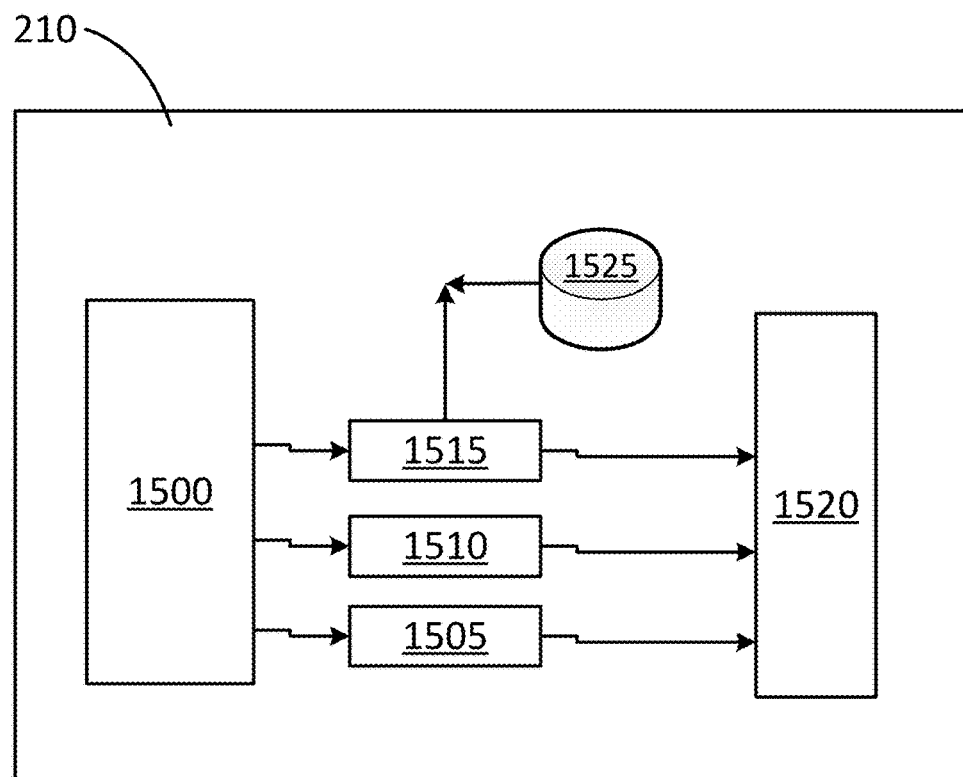
FIG. 5 is a schematic illustration of elements of an embodiment of a server type computing device.

FIG. 4 is a simplified illustration of some physical elements that may make up an embodiment of a computing device, such as the client computing device 212, and FIG. 5 is a simplified illustration of the physical elements that make up an embodiment of a server type computing device, such as may be used for the telephony application server (TAS) 210, the voice and messaging CSCFs, or other network nodes. Referring to FIG. 4, a sample computing device is illustrated that is physically configured to be part of the systems and method for reducing network disruptions. The computing device 212 may have a processor 1451 that is physically configured according to computer executable instructions. In some embodiments, the processor may be specially designed or configured to optimize communication between a server relating to the system described herein. The computing device 212 may have a portable power supply 1455 such as a battery, which may be rechargeable. It may also have a sound and video module 1461 which assists in displaying video and sound and may turn off when not in use to conserve power and battery life. The computing device 212 may also have volatile memory 1465 and non-volatile memory 1471. The computing device 212 may have GPS capabilities that may be a separate circuit or may be part of the processor 1451. There also may be an input/output bus 1475 that shuttles data to and from the various user input/output devices such as a microphone, a camera, a display, or other input/output devices. The computing device 212 also may control communicating with networks either through wireless or wired devices. Of course, this is just one embodiment of a computing device 212 and the number and types of computing devices 212 is limited only by the imagination.

The physical elements that make up an embodiment of a server, such as the TAS 210, are further illustrated in FIG. 5. In some embodiments, the traffic node server may be specially configured to run the system and methods for reducing network disruptions as disclosed herein. At a high level, the server 210 may include a digital storage such as a magnetic disk, an optical disk, flash storage, non-volatile storage, etc. Structured data may be stored in the digital storage a database. More specifically, the server 210 may have a processor 1500 that is physically configured according to computer executable instructions. In some embodiments, the processor 1500 can be specially designed or configured to optimize communication between a computing device, such as computing device 212, or between other system nodes such as a requesting node, and the server 210 relating to the system as described herein. The server 210 may also have a sound and video module 1505 which assists in displaying video and sound and may turn off when not in use to conserve power and battery life. The server 210 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, a user data controller for running a user data API may be located on the computing device 212. However, in other embodiments, the user data controller may be located on server 210, or both the computing device 212 and the server 210. Of course, this is just one embodiment of the server 210 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for monitoring 5G standalone customer call performance in a cellular network, the method comprising:
    receiving call data from one or more network nodes, the call data including session initiated protocol (SIP) records and call detail records (CDRs) for a plurality of voice calls made in the cellular network;
    identifying a set of fall back voice calls from the plurality of voice calls, wherein the SIP records for each of the voice calls in the set of fall back voice calls includes a fall back indicator;
    analyzing the CDRs for the set of fall back voice calls to identify one or more termination cause codes associated with the fall back voice calls;
    aggregating the one or more termination cause codes identified in the CDRs for the set of fall back voice calls;
    determining, based on the aggregated termination cause codes, a value for at least one key performance indicator (KPI) for the cellular network; and
    based on the at least one KPI for the cellular network, identifying one or more call performance problems associated with the set of fall back voice calls.

2. The method of claim 1, wherein the fall back voice calls are voice calls initiated over 5G new radio (NR) that are completed using voice over evolved packet system (VoEPS).

3. The method of claim 1, wherein the fall back indicator is an indicator that the voice call was initiated over 5G new radio (NR).

4. The method of claim 1, wherein identifying the one or more call performance problems associated with the set of fall back voice calls includes comparing the at least one KPI value to at least one predetermined threshold value.

5. The method of claim 1, wherein the call data is received from an internet protocol multimedia subsystem (IMS) core associated with the cellular network.

6. The method of claim 5, wherein the call data is received from a telephony application server (TAS) within the IMS core.

7. The method of claim 1, wherein the set of fall back voice calls are initiated by 5G standalone (SA) customers.

8. A computer-implemented method for monitoring 5G standalone customer call performance, the method comprising:
- receiving a plurality of call detail records (CDRs) from an internet protocol multimedia subsystem (IMS) core, each of the plurality of CDRs including a set of cause codes;
- analyzing the plurality of CDRs to identify one or more fall back calls, wherein the respective one of the plurality of CDRs of each of the one or more fall back calls includes at least one fall back indicator code;
- generating a set of fall back cause codes, the set of fall back cause codes being determined from the sets of cause codes associated with the CDRs of each of the one or more fall back calls;
- determining a value for one or more call performance metrics based on the cause codes in the set of fall back cause codes; and
- identifying one or more call performance problems based on the values of the one or more call performance metrics.

9. The method of claim 8, wherein the plurality of CDRs are associated with calls using an evolved packet system.

10. The method of claim 8, wherein the call performance metrics include one or more of a call setup success rate, a call setup failure rate, a drop call rate, and a call setup time.

11. The method of claim 8, wherein plurality of CDRs are received from a telephony application server (TAS) of the IMS core.

12. The method of claim 8, wherein the at least one fall back indicator is a new radio (NR) indicator code indicating that the call associated with the respective CDR was initiated from a 5G standalone customer.

13. The method of claim 8, wherein the one or more fall back calls are calls initiated by a 5G standalone customer that were connected using an evolved packet system.

14. A computer-implemented method of for optimizing cellular network performance, the method comprising:
- identifying a plurality of voice call records stored on an application server in a first type of cellular network;
- analyzing call data associated with the plurality of voice call records;
- identifying a set of fall back voice call records of the plurality of voice call records, wherein the call data for each voice call record of the set of fall back voice call records includes a fall back indicator indicating that each voice call associated with each of the fall back voice call records in the set of fall back voice call records was initiated using a second type of cellular network different than the first type of cellular network;
- analyzing cause codes in the call data associated with the set of fall back voice call records; and
- determining, based on the cause codes, a value for at least one key performance indicator (KPI) associated with the second type of cellular network.

15. The method of claim 14 further comprising identifying one or more call performance problems associated with the set of fall back voice calls.

16. The method of claim 14, wherein the first type of cellular network is a 4G cellular network and the second type of network is a 5G.

17. The method of claim 14, wherein the call data for the plurality of voice call records includes a call detail record (CDR) and a session initiation protocol (SIP) record for each voice call record.

18. The method of claim 17, wherein the fall back indicator identified for each voice call record in the set of fall back voice call records is part of the SIP record.

19. The method of claim 17, wherein the cause codes identified for each voice call record in the set of fall back voice call records is part of the CDR.

20. The method of claim 14 further comprising:
- comparing the value for the at least one KPI associated with the second type of cellular network to a predetermined threshold KPI value; and
- based on a determination that the value for the at least one KPI exceeds the predetermined threshold KPI value, identifying one or more call performance problems associated with the set of fall back voice calls.

* * * * *